United States Patent [19]

Bank et al.

[11] Patent Number: 5,709,411
[45] Date of Patent: Jan. 20, 1998

[54] DRAFT COMPENSATING COUPLING MEMBER

[75] Inventors: Michael D. Bank, South Euclid, Ohio; Michael R. Miller, Churubusco, Ind.

[73] Assignee: The Lamson & Sessions Co., Cleveland, Ohio

[21] Appl. No.: 635,643

[22] Filed: Apr. 22, 1996

[51] Int. Cl.⁶ .................................................. F16L 17/06
[52] U.S. Cl. ...................... 285/110; 285/331; 285/906; 285/910
[58] Field of Search ........................... 285/331, 110, 285/111, 906, 910; 277/205

[56] References Cited

U.S. PATENT DOCUMENTS

| Re. 9,737 | 5/1881 | Whittemore. | |
|---|---|---|---|
| Re. 33,199 | 4/1990 | Karr, Jr.. | |
| 52,010 | 1/1866 | Aldrich. | |
| 249,594 | 11/1881 | Dietz. | |
| 795,976 | 8/1905 | Herrick. | |
| 1,940,074 | 12/1933 | Burmeister. | |
| 4,116,473 | 9/1978 | Creus | 285/111 X |
| 4,202,568 | 5/1980 | Strom. | |
| 4,400,019 | 8/1983 | Fruck. | |
| 4,452,462 | 6/1984 | Karr, Jr.. | |
| 4,819,972 | 4/1989 | Champa et al.. | |
| 5,362,112 | 11/1994 | Hamilton et al.. | |

FOREIGN PATENT DOCUMENTS

| 663051 | 5/1963 | Canada | 285/111 |
|---|---|---|---|
| 366637 | 5/1990 | European Pat. Off. | 285/331 |
| 1965422 | 7/1970 | Germany | 285/331 |

*Primary Examiner*—Dave W. Arola
*Attorney, Agent, or Firm*—Jones, Day, Reavis & Pogue

[57] ABSTRACT

A coupling member includes a ring is formed with a predetermined draft angle. A gasket is provided for creating a seal between the ring and the end grooves of the conduit. The gasket comprises first and second walls which define an interior cavity for receiving the ring. The first and second walls have differential thicknesses so as to accommodate the draft angle of the ring. A plurality of fins are formed integrally on the exterior of the gasket for creating an interference fit with the end grooves.

In the preferred embodiment, the first wall is substantially thicker than the second wall and the fins exterior to the first wall are thicker than the fins on the second wall. Also, the thicknesses of the first and second walls are preferably tapered so as to define an interior cavity having a draft angle equal to that of the ring.

24 Claims, 3 Drawing Sheets

5,709,411

DRAFT COMPENSATING COUPLING MEMBER

BACKGROUND OF THE INVENTION

The present invention is directed to the art of conduit joints, particularly those used for joining large sections of plastic pipe of the type used in relining sewer lines. The conduit joint of the present invention can also be used for joining pipes and conduits of a variety of types which can be used in a number of different applications.

In recent years, techniques have been developed for relining degraded sewer lines by driving sections of plastic pipe axially into a sewer line. Such pipes must be connected using special joints capable of withstanding the high axial loads which are applied during pipe insertion while providing a fluid-tight seal during operational use.

An example of such a previous pipe joint is shown in FIGS. 1 and 2. Two pipe sections 12, 14 each have respective circumferentially continuous end grooves 16, 18. A coupling member 20 fits within the end grooves to join and seal the abutting ends of the pipe sections. The coupling member 20 includes a rigid core 22 in the shape of an annular ring or cylindrical tube section. A resilient elastomeric gasket 26 is formed which engages the annular ring 22. The gasket 26 is formed with a plurality of fins 28 which create a fluid-tight seal when inserted into the end grooves 16, 18.

The annular ring 22 can be formed of a number of materials, preferably fiberglass, which impart the desired properties of mechanical strength and rigidity. However, it is difficult to manufacture such a part with an annular or cylindrical shape because such cylindrical parts are difficult to remove from the molds without actually damaging the parts. This increases the expense and difficulty of the manufacturing process.

SUMMARY OF THE INVENTION

In view of the difficulties and drawbacks encountered with previous coupling members, it would be advantageous to provide a coupling member including components which are easier to manufacture.

Therefore, there is a need for a coupling member including an improved annular ring which can be easily removed from the manufacturing equipment.

There is also a need for a coupling member including a gasket which cooperates with the improved annular ring so as to effectively provide a fluid-tight seal.

There is also a need for a coupling member including a gasket which cooperates with the improved annular ring so as to effectively transmit the force of insertion.

These needs and others are realized by the coupling member of the present invention in which the ring is formed with a predetermined draft angle so that it can be easily removed from the mold. A specially-shaped gasket is then provided to compensate for the draft angle in order to create a seal between the angled sides of the ring and the end grooves of a conduit, which have generally straight, smooth walls. The gasket comprises a first wall and a second wall, which define an interior cavity for receiving the ring. A plurality of fins are preferably formed integrally on the exterior of each wall for creating an interference fit with the end grooves.

The first and second walls have differential thicknesses so as to accommodate the draft angle of the ring. In the preferred embodiment, the first wall is substantially thicker than the second wall and the fins on the exterior of the first wall are thicker than the fins on the exterior of the second wall. Also, the respective thicknesses of the first wall and the second wall are preferably tapered so as to define an interior cavity having a draft angle equal to that of the ring.

As will be appreciated, the invention is capable of other and different embodiments, and its several details are capable of modifications in various respects, all without departing from the scope of the invention. Accordingly, the drawings and description are to be regarded as illustrative in nature and not restrictive.

BRIEF DESCRIPTION OF THE DRAWINGS

The embodiments of the invention will now be described by way of example only, with reference to the accompanying figures wherein the members bear like reference numerals and wherein.

DETAILED DESCRIPTION OF THE INVENTION

Figure 1:
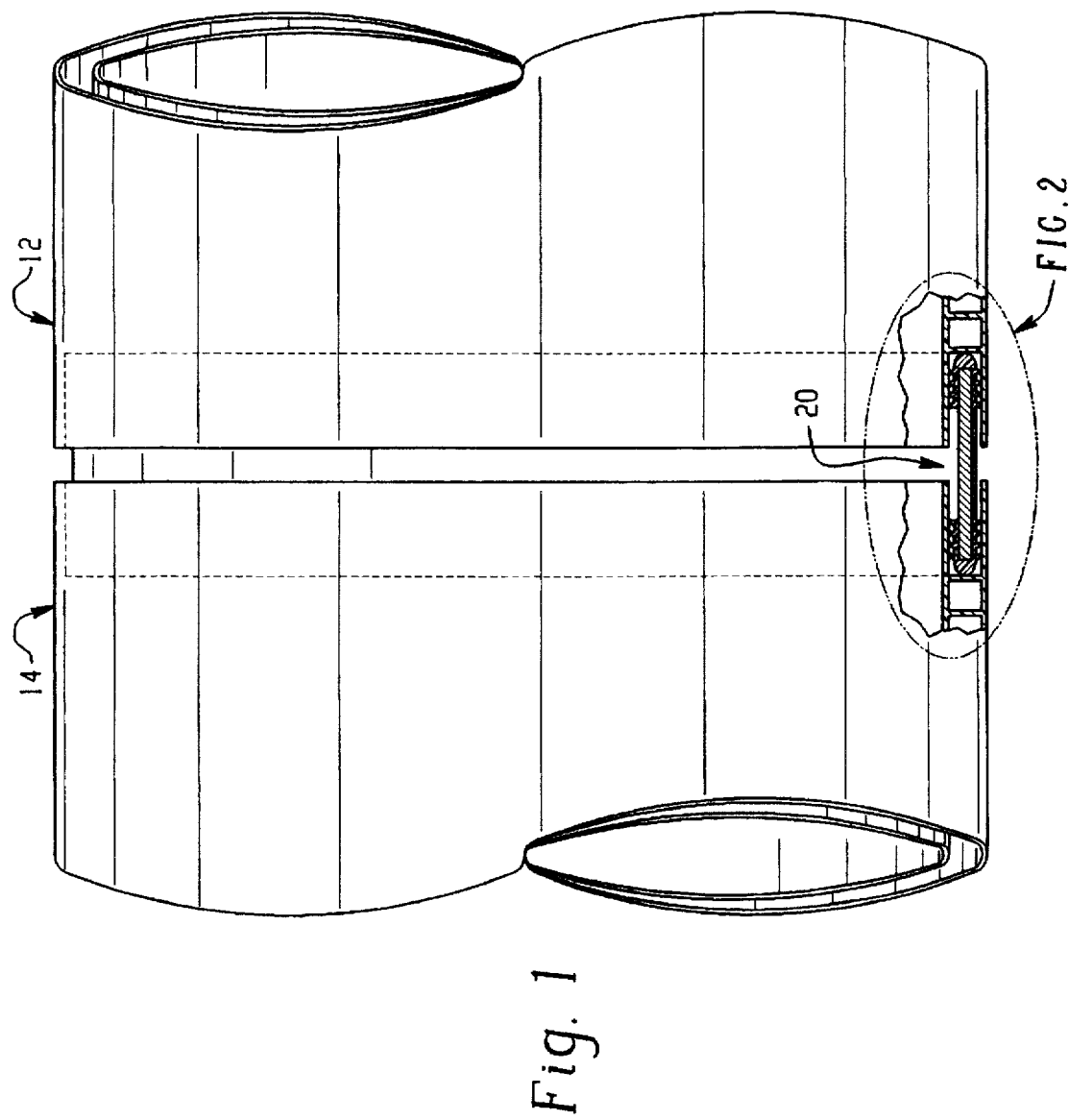
FIG. 1 is a side elevational view of pipe sections joined using a previous joint structure.
Figure 2:
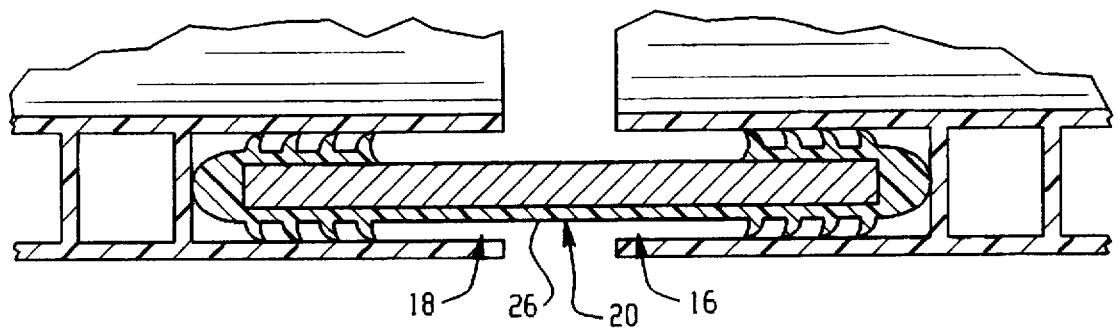
FIG. 2 is an enlarged view of the circled area of FIG. 1.
Figure 3:
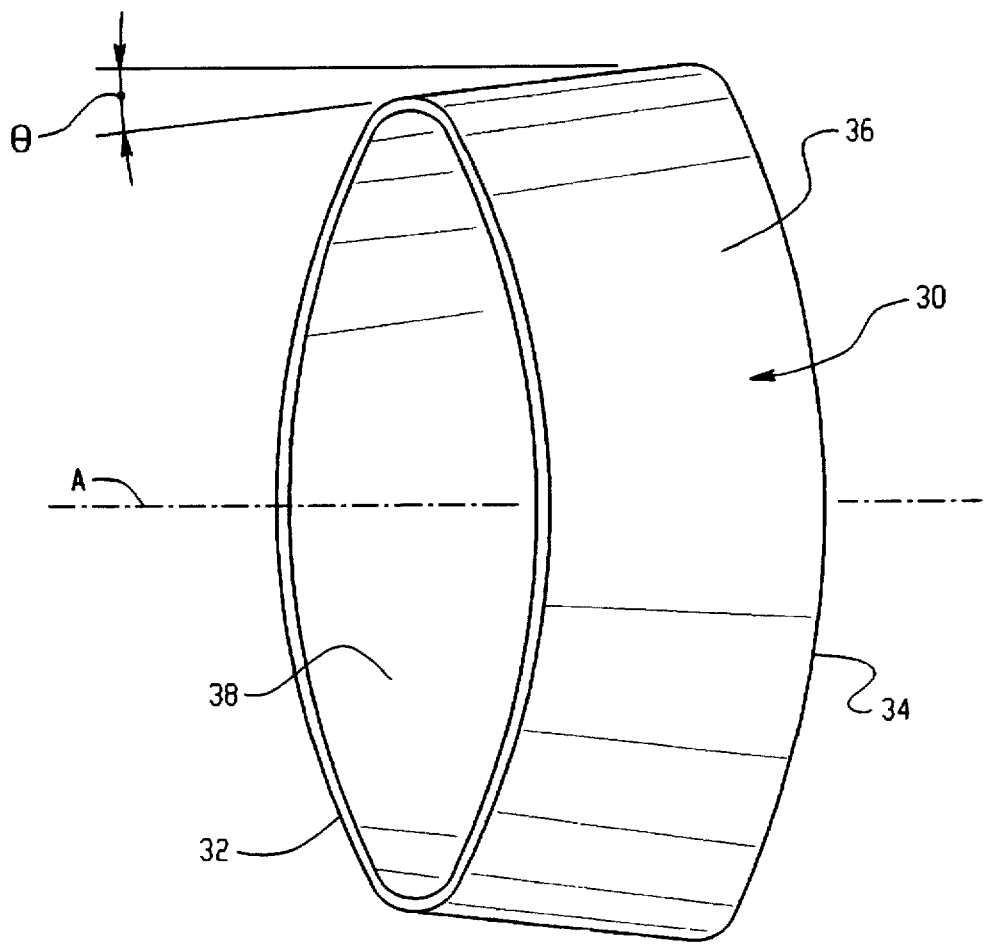
FIG. 3 is a side view illustrating the ring with draft angle in accordance with the present invention.
Figure 4:
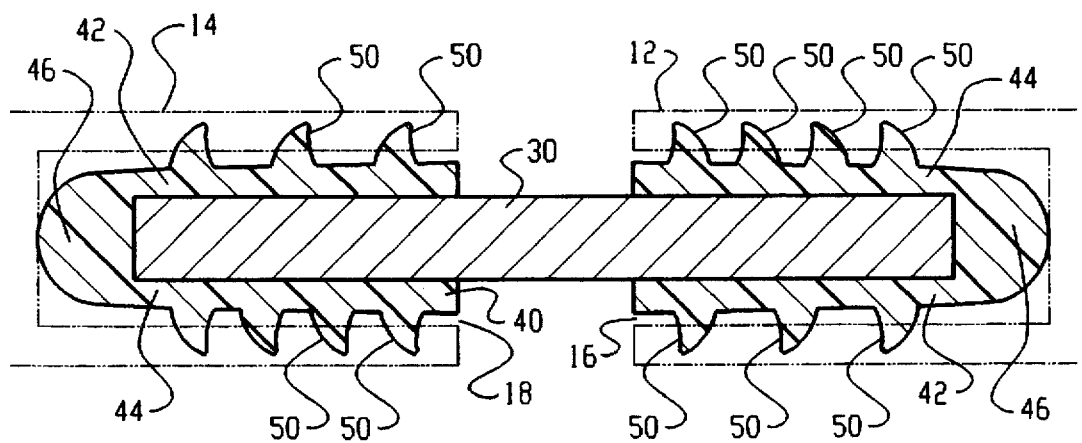
FIG. 4 is a side sectional view illustrating the coupling member including the draft compensating gasket in accordance with the present invention.
Figure 5:
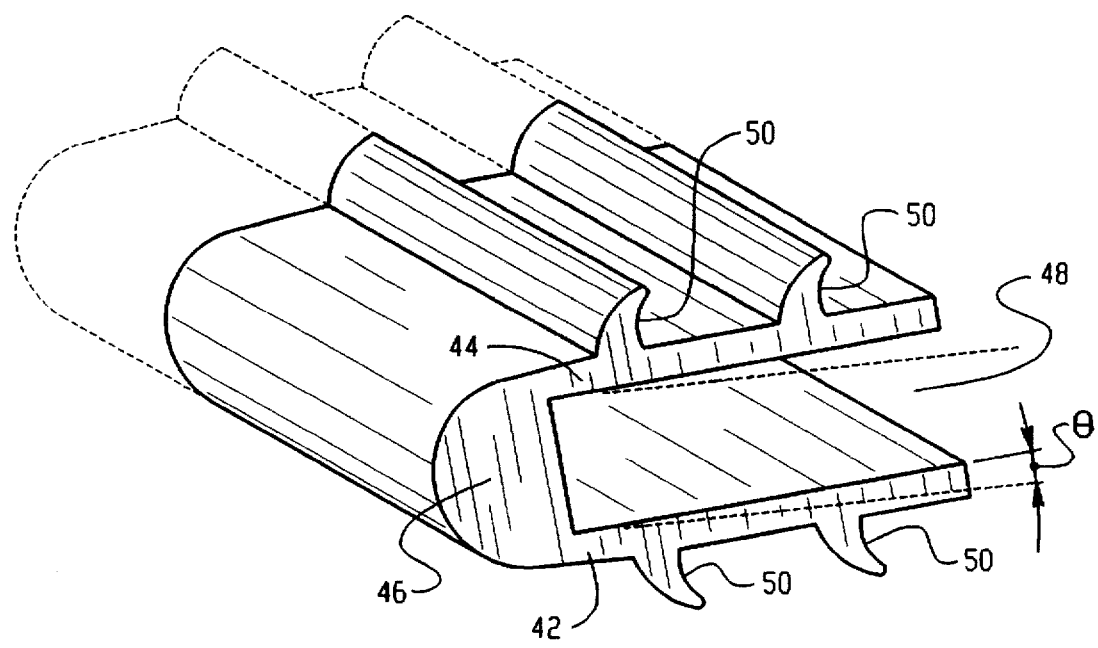
FIG. 5 is an oblique view illustrating the configuration of the gasket in accordance with the present invention.

Referring now to the drawings which are for purposes of illustrating only the preferred embodiment of the invention and not for purposes of limiting the same, FIGS. 3–5 show a coupling member for joining two sections of conduit of the type where each conduit section is formed with exterior and interior walls and a space therebetween which preferably defines a circumferentially continuous end grooves at the end of each conduit.

Turning specifically to FIG. 3, a ring 30 is shown which forms the rigid core of the coupling member as according to the present invention. The ring 30 is preferably symmetrical about an axis A and is formed of fiberglass, preferably in the shape of a short, hollow, generally cylindrical section having an exterior surface 36 and an interior surface 38. In order to facilitate release from the mold during manufacturing, the ring 30 is formed with a small draft angle θ. As used herein, "draft angle" refers to the slight taper imparted to the shape of the ring 30. To create the draft angle, the ring is inwardly inclined toward the cylindrical axis A. The ring 30 thus has a slight frusto-conical shape, with one end 32 having a smaller diameter than the other end 34. In the preferred embodiment, the draft angle is about three-fourths of a degree.

As seen in FIGS. 4 and 5, the gasket 40 of the present invention is designed to compensate for the draft of the ring 30. The present gasket 40 is formed of an elastomeric material, preferably polyisoprene, and includes a first wall 42 and a second wall 44 which are preferably joined by a rounded end nose 46, so as to define an interior cavity 48 for receiving the ring 30. The first and second walls 42, 44 are preferably made with differential thicknesses, i.e. the wall thickness of each wall 42, 44 varies from the nose end to the open end. These differential thicknesses result in a wall with a tapered cross section. In this way, the surfaces of the interior cavity 48 are not parallel to the exterior surfaces of the walls 47, 44 but are sloped to correspond to the draft angle of the ring 30. In this way, the gasket 40 compensates for the draft angle of the ring 30 so that it can be inserted into the straight radial end grooves of the pipe, thereby uniformly filling the groove and providing a uniform compression of the gasket 40 around all sides.

In the preferred embodiment, the exterior surfaces of the first wall 42 and the second wall 44 are generally parallel. A plurality of fins 50 are formed on the exterior surfaces. Due to the draft angle, the ring 30 tends to reside in an eccentric position within the end groove. In order to further compensate for the draft angle, the first wall 42 is made substantially thicker than the second wall 44. For a ring 30 with a draft angle of about three-fourths of a degree, the first wall 42 is preferably made about 8% thicker than the second wall 44. Also, the fins 50 extending from the first wall 42 are also preferably made about 11% thicker (i.e. extending further from the wall) than the fins 50 which extend from the second wall 44. Alternatively, the walls 42, 44 can be made with approximately the same thickness, with the fins 50 on the second wall 44 made correspondingly different so as to compensate for the draft angle of the ring 30. Also, the fins 50 can be made of equal thickness with the wall thicknesses differing so as to compensate for the draft angle in this way.

By providing a gasket 40 having walls 42, 44 and fins 50 with differing thicknesses, the ring 30 fits flush within the end grooves so that the gaps between the exterior surface 36 and interior surface 38 of the ring 30 are equally compensated for within the end groove by the gasket 40. In this way, the gasket provides an equal distribution of sealing force between the ring 30 and the end groove. Upon insertion into the end grooves, the fins 50 are radially compressed, forming a fluid-tight interference fit with the interior surfaces of the end grooves. By providing an equal distribution of force, the gasket 40 permits a fluid-tight seal to be achieved between the parallel end groove surfaces and the inclined surfaces of the ring 30.

As described above, the present invention solves many problems associated with previous systems, and presents improved efficiency and operability. However, it will be appreciated that various changes in the details, materials and arrangements of parts which have been herein described and illustrated in order to explain the nature of the invention may be made by those skilled in the art within the principle and scope of the invention as expressed by the appended claims.

We claim:

1. A coupling member for joining two sections of conduit which each have circumferential end grooves, said coupling member comprising:
    a ring for fitting into the respective end grooves, said ring having a predetermined draft angle;
    a gasket for creating a seal between said ring and said end grooves, said gasket comprising:
        a first wall and a second wall, joined at a nose end, each of said walls having an exterior surface, said walls and nose end defining an interior cavity having an open end for receiving the ring, wherein the respective thicknesses of said first wall and said second wall vary from the nose end to the open end, resulting in walls with tapered cross sections, so as to accommodate the draft angle of the ring.

2. The coupling member of claim 1 further comprising a plurality of fins positioned on the exterior of the gasket for creating an interference fit with the end grooves.

3. The coupling member of claim 2 wherein the fins on the exterior of the first wall extend further from the wall than the fins on the exterior of the second wall.

4. The coupling member of claim 2 wherein the fins on the exterior of the second wall extend further from the wall than the fins on the exterior of the first wall.

5. The coupling member of claim 1 wherein the first wall is thicker than the second wall.

6. The coupling member of claim 1 wherein the ring has a generally circular cross-section.

7. The coupling member of claim 1 wherein the draft angle is three-fourths of a degree.

8. A gasket for use with a coupling member for joining two sections of conduit which each have circumferential end grooves, said coupling member comprising a ring for fitting into the respective end grooves, said ring having a predetermined draft angle, said gasket for creating a seal between said ring and said end grooves, said gasket comprising:
    a first wall and a second wall, joined at a nose end, each of said walls having an exterior surface, said walls and nose end defining an interior cavity having an open end for receiving the ring, wherein the respective thicknesses of said first wall and said second wall vary from the nose end to the open end, resulting in walls with tapered cross sections, so as to accommodate the draft angle of the ring.

9. The gasket of claim 8 further comprising a plurality of fins positioned on the exterior of the gasket for creating an interference fit with the end grooves.

10. The gasket of claim 9 wherein the fins on the exterior of the first wall extend further from the wall than the fins on the exterior of the second wall.

11. The gasket of claim 9 wherein the fins on the exterior of the second wall extend further from the wall than the fins on the exterior of the first wall.

12. The gasket of claim 8 wherein the first wall is thicker than the second wall.

13. A coupling member for joining two sections of conduit which each have circumferential end grooves, said coupling member comprising:
    a ring for fitting into the respective end grooves, said ring having a predetermined draft angle;
    a gasket for creating a seal between said ring and said end grooves, said gasket comprising:
        a first wall and a second wall, each of said walls having an exterior surface, said walls defining an interior cavity for receiving the ring;
        a plurality of fins positioned on the exterior of the gasket for creating an interference fit with the end grooves, wherein at least one of the first wall, the second wall and the plurality of fins are formed with a respective varying thickness different from the respective others so as to accommodate for the draft angle of the ring.

14. The coupling member of claim 13 wherein the fins on the exterior of the first wall extend further from the wall than the fins on the exterior of the second wall.

15. The coupling member of claim 13 wherein the fins on the exterior of the second wall extend further from the wall than the fins on the exterior of the second first wall.

16. The coupling member of claim 13 wherein the first wall is thicker than the second wall.

17. The coupling member of claim 13 wherein the thicknesses of said respective first and second walls vary so as to result in a tapered cross section so as to define an interior cavity having a draft angle equal to that of the ring.

18. The coupling member of claim 13 wherein the ring has a generally circular cross-section.

19. The coupling member of claim 13 wherein the draft angle is three-fourths of a degree.

20. A gasket for use with a coupling member for joining two sections of conduit which each have circumferential end grooves, said coupling member comprising a ring for fitting into the respective end grooves, said ring having a predetermined draft angle, said gasket for creating a seal between said ring and said end grooves, said gasket comprising:
- a first wall and a second wall, each of said walls having an exterior surface, said walls defining an interior cavity for receiving the ring;
- a plurality of fins positioned on the exterior of the gasket for creating an interference fit with the end grooves, wherein at least one of the first wall, the second wall and the plurality of fins are formed with a respective varying thickness different from the respective others so as to accommodate for the draft angle of the ring.

21. The gasket of claim 20 wherein the fins on the exterior of the first wall extend further from the wall than the fins on the exterior of the second wall.

22. The gasket of claim 20 wherein the fins on the exterior of the second wall extend further from the wall than the fins on the exterior of the first wall.

23. The gasket of claim 20 wherein the first wall is thicker than the second wall.

24. The gasket of claim 20 wherein the thicknesses of said respective first and second walls vary so as to result in a tapered cross section so as to define an interior cavity having a draft angle equal to that of the ring.

* * * * *

UNITED STATES PATENT AND TRADEMARK OFFICE
CERTIFICATE OF CORRECTION

PATENT NO. : 5,709,411
DATED : January 20, 1998
INVENTOR(S) : Michael D. Bank; Michael R. Miller It is certified that error appears in the above-indentified patent and that said Letters Patent is hereby corrected as shown below:

Claim 15 should read as follows:

15. The coupling member of claim 13 wherein the fins on the exterior of the second wall extend further from the wall than the fins on the exterior of the [second] first wall.

Signed and Sealed this

Twenty-fourth Day of March, 1998

*Attest:*

BRUCE LEHMAN

*Attesting Officer*  *Commissioner of Patents and Trademarks*